US012613751B2

(12) United States Patent
Fang et al.

(10) Patent No.: US 12,613,751 B2
(45) Date of Patent: Apr. 28, 2026

(54) JOB SCHEDULER FOR MULTI-TENANT FAIRNESS

(71) Applicant: Oracle International Corporation, Redwood Shores, CA (US)

(72) Inventors: Ming Fang, Sammamish, WA (US); Xinyue Yu, Seattle, WA (US); Michal Piotr Prussak, Kirkland, WA (US); Vladislavs Dovgalecs, Bellevue, WA (US); Wei Gao, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 515 days.

(21) Appl. No.: 18/093,273

(22) Filed: Jan. 4, 2023

(65) Prior Publication Data
US 2024/0220328 A1 Jul. 4, 2024

(51) Int. Cl.
*G06F 9/50* (2006.01)

(52) U.S. Cl.
CPC ........ *G06F 9/505* (2013.01); *G06F 2209/503* (2013.01)

(58) Field of Classification Search
CPC .. G06F 9/505; G06F 2209/503; G06F 9/5027; G06F 2209/504
See application file for complete search history.

(56) References Cited

U.S. PATENT DOCUMENTS 8,468,251 B1 6/2013 Pijewski et al.
10,360,086 B2 7/2019 Langouev et al.

10,990,402 B1 * 4/2021 Ibryam ............... G06F 12/0875
11,175,950 B1 * 11/2021 Yang ..................... G06F 9/5038
2015/0058484 A1 2/2015 Mehta et al.
2017/0063989 A1 * 3/2017 Langouev .............. H04L 67/62
2018/0336067 A1 * 11/2018 Lee .......................... H04L 47/34

(Continued)

OTHER PUBLICATIONS

Krebs et al., "Comparison of Request Admission Based Performance Isolation Approaches in Multi-Tenant SaaS Applications", Available online at: https://sdqweb.ipd.kit.edu/publications/pdfs/KrLo2014_Closer_IsolationTypes.pdf, Apr. 2014, 6 pages.

(Continued)

*Primary Examiner* — Sisley N Kim
(74) *Attorney, Agent, or Firm* — Kilpatrick Townsend & Stockton LLP

(57) ABSTRACT

Techniques are described for determining whether to process a job request. An example, method can include a device receiving a first message from a first stream, the first message comprising a job request from a tenant and a tenant identifier. The device can detect a base number of units permissible to be processed for the tenant over a unit of time. The device can detect a processing speed of a downstream processor of an asynchronous pipeline. The device can detect a number of messages in a second stream, the downstream processor configured to receive messages from the second stream. The device can determine a target throughput and a historical throughput for the tenant. The device can compare the target throughput with the historical throughput to determine whether to process the job request. The device can schedule the job request for processing based at least in part on the comparison.

17 Claims, 9 Drawing Sheets

100

(56) References Cited

U.S. PATENT DOCUMENTS

| 2023/0108560 | A1* | 4/2023 | Wang | ................. | G06F 3/04817 |
| | | | | | 717/109 |
| 2024/0028392 | A1* | 1/2024 | Wei | ...................... | G06F 9/4881 |

OTHER PUBLICATIONS

Ru et al., "Providing Fairer Resource Allocation for Multi-Tenant Cloud-Based Systems", Conference: 2015 IEEE 7th International Conference on Cloud Computing Technology and Science, Nov. 2015.

Shue et al., "Performance Isolation and Fairness for Multi-Tenant Cloud Storage", 10th USENIX Symposium on Operating Systems Design and Implementation (OSDI '12), Available Online at: https://www.usenix.org/system/files/conference/osdi12/osdi12-final-215.pdf, Oct. 2012, pp. 349-362.

Walraven et al., "Adaptive Performance Isolation Middleware for Multi-Tenant SaaS", Proceedings of the 8th International Conference on Utility and Cloud Computing, Dec. 2015, pp. 112-121.

Wang et al., "Container-Based Performance Isolation for Multi-Tenant SaaS Applications in Micro-Service Architecture", Journal of Physics: Conference Series, Available online at: https://iopscience.iop.org/article/10.1088/1742-6596/1486/5/052032/pdf, Apr. 2020, 10 pages.

Yanacek , "Fairness in Multi-Tenant Systems", Available Online at https://aws.amazon.com/builders-library/fairness-in-multi-tenant-systems/, 2020, 18 pages.

* cited by examiner

400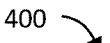

| RECEIVING A FIRST MESSAGE FROM A FIRST MESSAGE STREAM, THE FIRST MESSAGE COMPRISING A JOB REQUEST FROM A TENANT AND A TENANT IDENTIFIER | 402 |

| DETECTING A BASE NUMBER OF UNITS PERMISSIBLE TO BE PROCESSED FOR THE TENANT OVER A UNIT OF TIME | 404 |

| DETECTING A PROCESSING SPEED OF A DOWNSTREAM PROCESSOR OF AN ASYNCHRONOUS PIPELINE | 406 |

| DETECTING A NUMBER OF MESSAGES IN A SECOND MESSAGE STREAM, THE DOWNSTREAM PROCESSOR CONFIGURED TO RECEIVE MESSAGES FROM THE SECOND MESSAGE STREAM | 408 |

| DETERMINING A TARGET THROUGHPUT FOR THE TENANT BASED AT LEAST IN PART ON A MATHEMATICAL OPERATION USING THE BASE NUMBER, THE NUMBER OF MESSAGES IN THE SECOND STREAM, AND THE PROCESSING SPEED OF THE DOWNSTREAM PROCESSOR | 410 |

| DETERMINING A HISTORICAL THROUGHPUT FOR THE TENANT BASED AT LEAST IN PART ON AN AVERAGE NUMBER OF UNITS PROCESSED OVER THE UNIT OF TIME | 412 |

| COMPARING THE TARGET THROUGHPUT WITH THE HISTORICAL THROUGHPUT TO DETERMINE WHETHER TO PROCESS THE JOB REQUEST | 414 |

| SCHEDULING THE JOB REQUEST FOR PROCESSING BASED AT LEAST IN PART ON THE COMPARISON | 416 |

FIG. 4

JOB SCHEDULER FOR MULTI-TENANT FAIRNESS

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others. In many instances, a cloud service provider can offer on-demand services, such as a forecasting service.

BRIEF SUMMARY

Embodiments described herein are directed toward a method for multi-tenant fairness determination of whether to process a job request. The method includes a computing device receiving a first message from a first message stream, the first message comprising a job request from a tenant and a tenant identifier.

The method further includes the computing device detecting a base number of units permissible to be processed for the tenant over a unit of time.

The method further includes the computing device detecting a processing speed of a downstream processor of an asynchronous pipeline.

The method further includes the computing device detecting a number of messages in a second message stream, the downstream processor configured to receive messages from the second message stream.

The method further includes determining a target throughput for the tenant based at least in part on a mathematical operation using the base number, the number of messages in the second message stream, and the processing speed on the downstream processor.

The method further includes the computing device determining, by the computing device, a historical throughput for the tenant based at least in part on an average number of units processed over the unit of time.

The method further includes the computing device comparing the target throughput with the historical throughput to determine whether to process the job request.

The method further includes scheduling the job request for processing based at least in part on the comparison.

Embodiments can further include a computing device, including a processor and a computer-readable medium including instructions that, when executed by the processor, can cause the processor to perform operations including receiving a first message from a first message stream, the first message comprising a job request from a tenant and a tenant identifier.

The instructions that, when executed by the processor, can further cause the processor to perform operations including detecting a base number of units permissible to be processed for the tenant over a unit of time.

The instructions that, when executed by the processor, can further cause the processor to perform operations including detecting a processing speed of a downstream processor of an asynchronous pipeline.

The instructions that, when executed by the processor, can further cause the processor to perform operations including detecting a number of messages in a second message stream, the downstream processor configured to receive messages from the second message stream.

The instructions that, when executed by the processor, can further cause the processor to perform operations including determining a target throughput for the tenant based at least in part on a mathematical operation using the base number, the number of messages in the second message stream, and the processing speed on the downstream processor.

The instructions that, when executed by the processor, can further cause the processor to perform operations including determining, by the computing device, a historical throughput for the tenant based at least in part on an average number of units processed over the unit of time.

The instructions that, when executed by the processor, can further cause the processor to perform operations including comparing the target throughput with the historical throughput to determine whether to process the job request.

The instructions that, when executed by the processor, can further cause the processor to perform operations including scheduling the job request for processing based at least in part on the comparison.

Embodiments can further include a non-transitory computer-readable medium including stored thereon instructions that, when executed by a processor, causes the processor to perform operations including receiving a first message from a first message stream, the first message comprising a job request from a tenant and a tenant identifier.

The instructions that, when executed by the processor, can further cause the processor to perform operations including detecting a base number of units permissible to be processed for the tenant over a unit of time.

The instructions that, when executed by the processor, can further cause the processor to perform operations including detecting a processing speed of a downstream processor of an asynchronous pipeline.

The instructions that, when executed by the processor, can further cause the processor to perform operations including detecting a number of messages in a second message stream, the downstream processor configured to receive messages from the second message stream.

The instructions that, when executed by the processor, can further cause the processor to perform operations including determining a target throughput for the tenant based at least in part on a mathematical operation using the base number, the number of messages in the second message stream, and the processing speed on the downstream processor.

The instructions that, when executed by the processor, can further cause the processor to perform operations including determining, by the computing device, a historical throughput for the tenant based at least in part on an average number of units processed over the unit of time.

The instructions that, when executed by the processor, can further cause the processor to perform operations including comparing the target throughput with the historical throughput to determine whether to process the job request.

The instructions that, when executed by the processor, can further cause the processor to perform operations including scheduling the job request for processing based at least in part on the comparison.

BRIEF DESCRIPTION OF THE DRAWINGS

FIG. 4 is a process flow for a job scheduler implementing a multi-tenant fairness algorithm, according to one or more embodiments.

DETAILED DESCRIPTION

Figure 1:
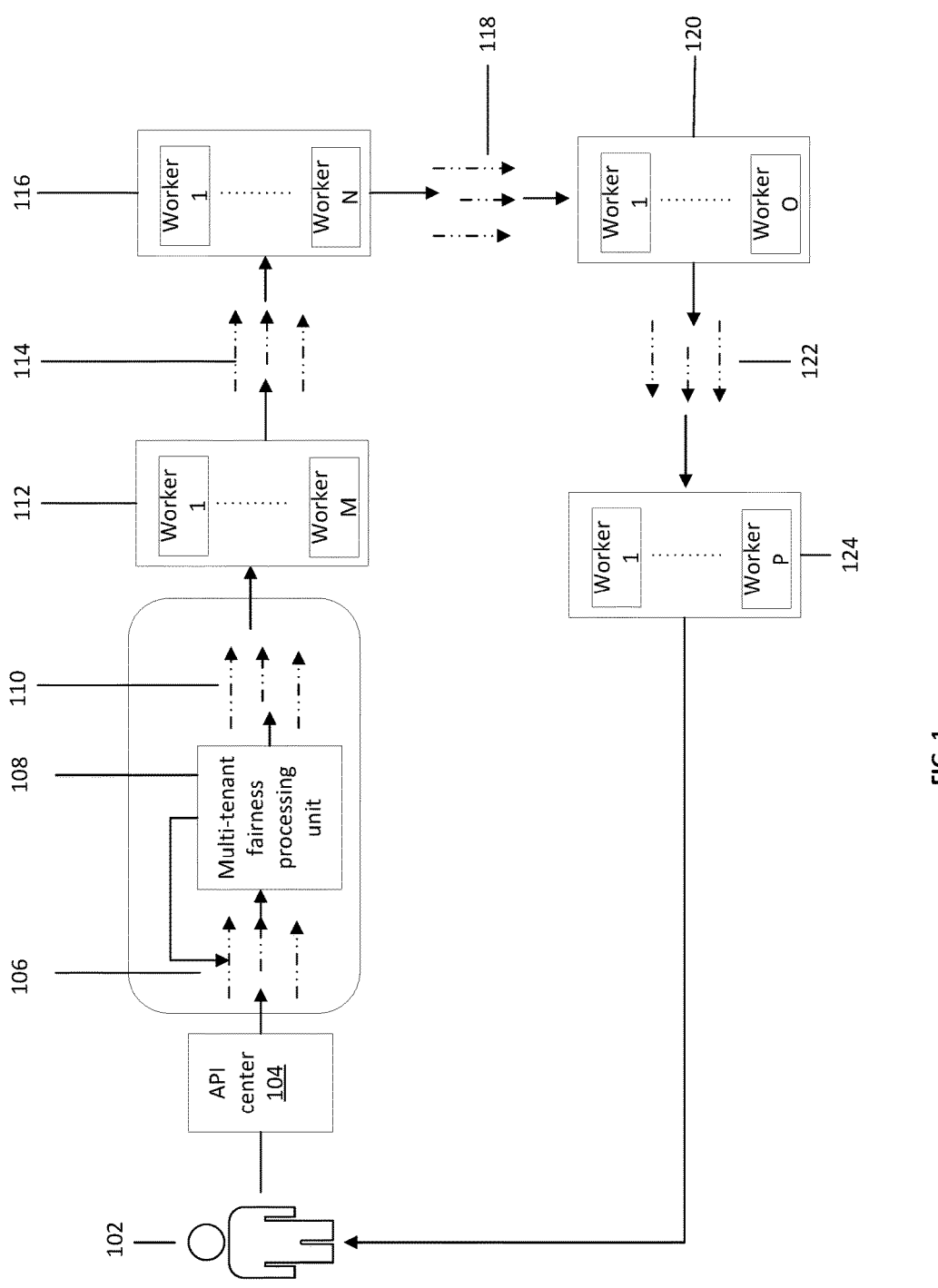
FIG. 1 is an illustration of an asynchronous pipeline configured for multi-tenant fairness, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud service providers have adapted their infrastructure for asynchronous processing to support multiple tenants. In a multi-tenant system, the tenants share resources such as databases, services, processing capabilities for satisfying a tenant's job request. A job can correspond to a single asynchronous request from a tenant. A job is usually associated with an input (e.g., a 1000-page PDF or an-hour-long video). The cloud service provider can break up the input into smaller chunks (e.g., 5-page PDF chunk or 20-second-long video chunk) for better parallelism and less I/O. Each job is uniquely identified by an ID, and this ID can be later on used to retrieve job status and results. In some instances, a tenant will submit a large number of jobs for one or more input data sets. In other instances, a tenant will ask for one or additional resources to service a large input data set. Cloud service providers generally process all incoming job requests by using shared resources and the same job pipeline. As such, a large number of job requests or a large data set from a single tenant can lead to resource contention between the tenants. One or more nodes of the job pipeline become overloaded, and a bottleneck can form based on a spike in job requests or an overly large data set. Cloud service providers use resource-sharing models, but many models are not efficient at preventing a small number of tenants from dominating the job request pipeline and do not account for the dynamic nature of resource availability over time for cloud computing tenants.

Embodiments described herein address the above referenced issues by introducing multi-tenant fairness job scheduling that can be implemented at the beginning of the asynchronous pipeline is shown. A CSP that can implement a stream and database (DB) based job scheduler to manage asynchronous job processing. The job scheduler can determine whether to process a tenant's pending job request based on comparing the tenant's historical throughput with the tenant's target throughput. Based on a comparison of the historical throughput and the target throughput, the job scheduler can determine whether to process the request or throttle the request until the system has more capacity.

The CSP can calculate the historical throughput based on an average number of units processed for the tenant over a period of time, such as over a sliding window. The historical throughput can be continuously revised in real-time as the tenant's job requests increase or decrease. In some instances, the period of time can be based on a set window that precedes receipt of the pending job request.

The CSP can calculate the target throughput based on a base throughput, a system pressure, and a tenant weight. The base throughput can be based on the maximum processing capacity of the cloud computing environment can provide for a particular type of service. The CSP can calculate the base throughput based on the maximum number of units that the cloud computing environment can process for each tenant over a time interval. For example, if the cloud computing system can offer a document translation service that can process 100 units per minute and the cloud computing system has ten tenants that subscribe to the service, the base throughput can be set at 10 units per minute. It should be appreciated that the job pipeline can include multiple nodes, where some nodes can process inputs faster than other nodes. Therefore, in some instances, the base throughput can be based on the number of units that the slowest processor in the pipeline can process.

The CSP can calculate the system pressure based on the processing speed of a pipeline processor and the number of pending messages in an incoming job request stream. A stream can represent an unbounded, continuously updating data set. In some instances, the pipeline processor is the slowest processor in the pipeline. A message can be a key-value pair that carries some information that a publisher wants a worker (e.g., virtual machine) to work on. In some embodiments, a message can contain metadata (e.g., object storage location of a PDF page) instead of the actual data. Each worker can be an abstracted computing unit that is capable of executing some code. In some instances, a worker can be a publisher for one stream and a consumer for another stream at the same time. A worker can be as simple as a thread in a compute instance (e.g., a server).

The system pressure can be the processing speed "S" of the slowest processor divided by the number of pending messages "M." The CSP can detect the tenant weight "C" based on a hierarchical organization of tenants and a class of the tenant. Tenants can be divided into different classes based on agreements between the tenant and the CSP. The CSP can assign higher priority tenants a higher weight, such that the likelihood that a higher priority tenant's pending job request is greater than a lower priority tenant. The CSP can calculate the target throughput "T" by multiplying the base throughput "B" by the system pressure "S/M" by the tenant's weight "C." Each tenant can have a different weight. For example, one tenant can have a weight of 1, whereas another tenant has a weight of 1.5. For example, T (target throughput)=B*(S/M)*C. The CSP can process the tenant's pending job request based on a comparison of the calculated target throughput and historical throughput. For example, the CSP can throttle the tenant's pending job if the target throughput is less than the historical throughput. Additionally, the CSP can accept the tenant's pending job if the target throughput is greater than the historical throughput.

FIG. 1 is an illustration 100 of an asynchronous pipeline configured for multi-tenant fairness, according to one or more embodiments. A user 102 can transmit data and a request to process the data to an asynchronous pipeline of a cloud computing service. The user 102 can be a tenant of a cloud computing environment which implements the asynchronous pipeline for one or more services offered to the cloud computing environment's tenants. The data can include electronic health records, images, text documents, or other appropriate data. The request can include a request to convert the data from one format to another format, identify documents with key words or target images, translate documents, or other appropriate request.

The request and data can be received by an application programming interface (API) center 104. The API center 104 can include a set of definitions, protocols, and libraries that permit an external third party, such as the user 102 to communicate with the asynchronous pipeline. It should be appreciated that the API center 104 is configured to receive data from multiple tenants of the cloud computing environment and can include a suite of APIs for communicating with each of the tenants.

The API center 104 can generate a message, such as a streaming message, from the data received by each user, including, user 102. A stream can be a partly ordered, replayable, and fault-tolerant sequence of immutable data records (e.g., messages), where a data record is defined as a key-value pair. Each stream can be an object that can be subdivided into smaller objects as known as partitions. The partitions enable the asynchronous pipeline to split the messages, such that different partitions can be received by different nodes. Therefore, different nodes can read from the stream in parallel. Each streaming message can include a stream of values that include a user identifier (user ID), the data to be processed and can be associated with a data type.

The API center 104 can further publish the message to the staging stream 106 to be received by the multi-tenant fairness and processing unit 108. A message can include a message key, such as a tenant identifier (tenantID), so that jobs from the same tenant can go into the same partition to be evaluated for priority. The message can also include a message value for the tenant identifier.

The multi-tenant fairness process unit 108 can receive messages from the stream 106, include one or more messages from the user 102. The multi-tenant and fairness can evaluate the capacity of the system to determine whether to forward the messages for processing or to throttle the user's request. As described above, the multi-tenant fairness processing unit 108 acts a job scheduler that can compare the user's historical throughput, which can be an average number of units that have been processed for the user within a time window preceding the current request, with a target throughput, which can include the maximum number of units that the system can currently asynchronous pipeline can process for the tenant. The target throughput can be calculated based on a base throughput, a system pressure, and a tenant weight. If the target throughput is less than the historical throughput, the multi-tenant fairness process unit can throttle the request. For example, by redirecting the message back into the stream 106. The multi-tenant fairness processing unit 108 is described in more detail with respect to FIG. 2.

It should be appreciated that the historical throughput is based on a sliding window, and therefore can be a dynamically adjusted based on system traffic. For example, at one point in time, a tenant's historical throughput can show that the jobs being currently processed are the maximum allowable for the tenant. However, if the tenant's job requests begin to get throttled by the job scheduler, the number of jobs being currently being processed can decrease as the sliding window progresses in time to a second future point in time. This is due to job requests being satisfied and new job requests from the tenant being throttled. Therefore, the multi-tenant fairness processing unit 108 can throttle the tenant's job requests at the first point in time but allow the job request to be processed at the second point in time based on a comparison between the historical throughput and the target throughput.

Conversely, a tenant's historical throughput at one point in time can show that the number of job requests being processed is less than the maximum allowable job requests. Later at a second point in time, the tenant's job quests can increase to the maximum allowable number as a result of the tenant submitting new job requests that are not throttled. In this instance, the multi-tenant fairness processing unit 108 can allow the job request to be processed at the first point in time but throttle new job requests at the second point in time based on a comparison between the historical throughput and the target throughput.

The multi-tenant fairness processing unit 108 can create and publish messages to a preprocessing stream 110. For example, in instances that the target throughput is greater than the historical throughput, multi-tenant fairness processing unit 108 can include a priority processor that can create and publish messages for the tenant's job request to be processed. The message can include a message key, such as a job identifier (jobID). Each job request can be indexed and each jobID can be an index value. Therefore, the asynchronous pipe can use the jobID to process jobs in order. The message in the preprocessing stream 110 can also include a message value such as the jobID and time stamp for when the priority processor created the message.

The preprocessing unit 112 can include a processor that can receive a message from the preprocessing stream 110 for preparing a job to be processed. As indicated above, a message can include metadata describing a location of data to be used for a job. Therefore, the preprocessing unit 112 can read the metadata to determine a location of the input file to be used for the job. The input file can be stored, for example, in a customer object storage. The preprocessing unit 112 can further download the input file from the customer object storage. The processing unit 112 can then validate the input file (e.g., check the file for correctness, check format, etc.). The preprocessing unit 112 can then load the file into memory and divide the file into smaller pieces. For example, preprocessing unit 112 can divide the input file into chunks. For example, for documents, the preprocessing unit 112 can divide the document into five pages per chunk, or for a video twenty second of video per chunk. The preprocessing unit 112 can then upload the chunks in a service object storage (e.g., a vision services object storage). In some instances, the asynchronous pipeline includes a job status table. In these instances, the preprocessing unit 112 can update the table to indicate that the chunks have been uploaded to the service object storage. The preprocessing unit 112 can further create and transmit a message into a processing stream 114.

The message in the processing stream 114 can include a message key, such as a jobID and a chunk index. It should be appreciated that chunks can be distributed across different partitions and processed in parallel. The chunk index can describe an order of the chunks in relation to the input file. The message can further include a message value, such as an address of the chunk in service object storage, a value for the chunk index, a value for the chunk status, a total number of chunks to be processed for the job, a value for a file type, a value for any features, and a value for a timestamp.

The message from the processing stream 114 can be received by a processor 116. The processor 116 can include a computer instance (e.g., server) that can host a suit of virtual machines that can process the input file. The processor 116 can read the message to determine the address of each chunk. The processor 116 can further download the chunked input file from the customer object storage. The processor 116 can further parse each chunk for resizing, if necessary. The processor 116 can further process the chunks and reload the processed chunks into the service object storage.

The processor 116 can then create a message and transmit the message in a chunk status stream 118. The message can include a key, such as jobID, to enable chunk status for a same job to be in the same partition. Furthermore, a worker can exhaust all messages in a partition when it reads. The message can further include a value, such as a value for a jobID, an address for a chunk in service object storage, a value for a chunk index, a value for a total number of chunks, a timestamp, a value for any error.

The message can be received by a chunk status processor 120, which can be responsible for updating a job status table. The chunk status processor 120 can read messages from the chunk status stream 118 in batches and aggregate the chunks status based on the jobID. The chunk status processor 120 can use the jobID to read the job status table to determine how many chunks associated with the jobID have been processed completely. The chunk status processor 120 can further update the job status table the chunk status processor 120 based on original status identified from a database and status identified in the messages.

If all of the chunks have been completely processed, the chunk status processor 120 can create and send a message in a post-processing stream 122. The message can include a key, such as the jobID. As the jobID can be an index number of the chunks, the chunks can be post processed in order based on the jobID. The message can further include a value, such as value for a jobID, an address in a service object storage, a time stamp, and any error.

A postprocessor 124 can receive a message from the post processing stream 122. The postprocessor 124 can upload a chunked/paginated result to customer object storage and delete all temporary files from service object storage. The postprocessor 124 can update a job status in a jobs metadata table. The postprocessor 124 can further transmit a notification to a customer notification topic.

The multi-tenant fairness operation unit can be implemented by a priority processor, whose responsibility is to control whether a job can be transmitted to the asynchronous pipeline. Each tenant of the multi-tenant cloud computing environment can have an average quota of jobs (e.g., 50 PDF pages/minute) to be processed over a period of time. This quota can be adjusted based on a current system load. In the event that the priority processor receives a message from a staging stream, the priority processor can read a tenant ID and determine the number of jobs being processed over a window preceding the message. For example, the priority processor can determine the number of jobs the asynchronous pipeline is processing within one minute preceding receipt of the message.

Figure 2:
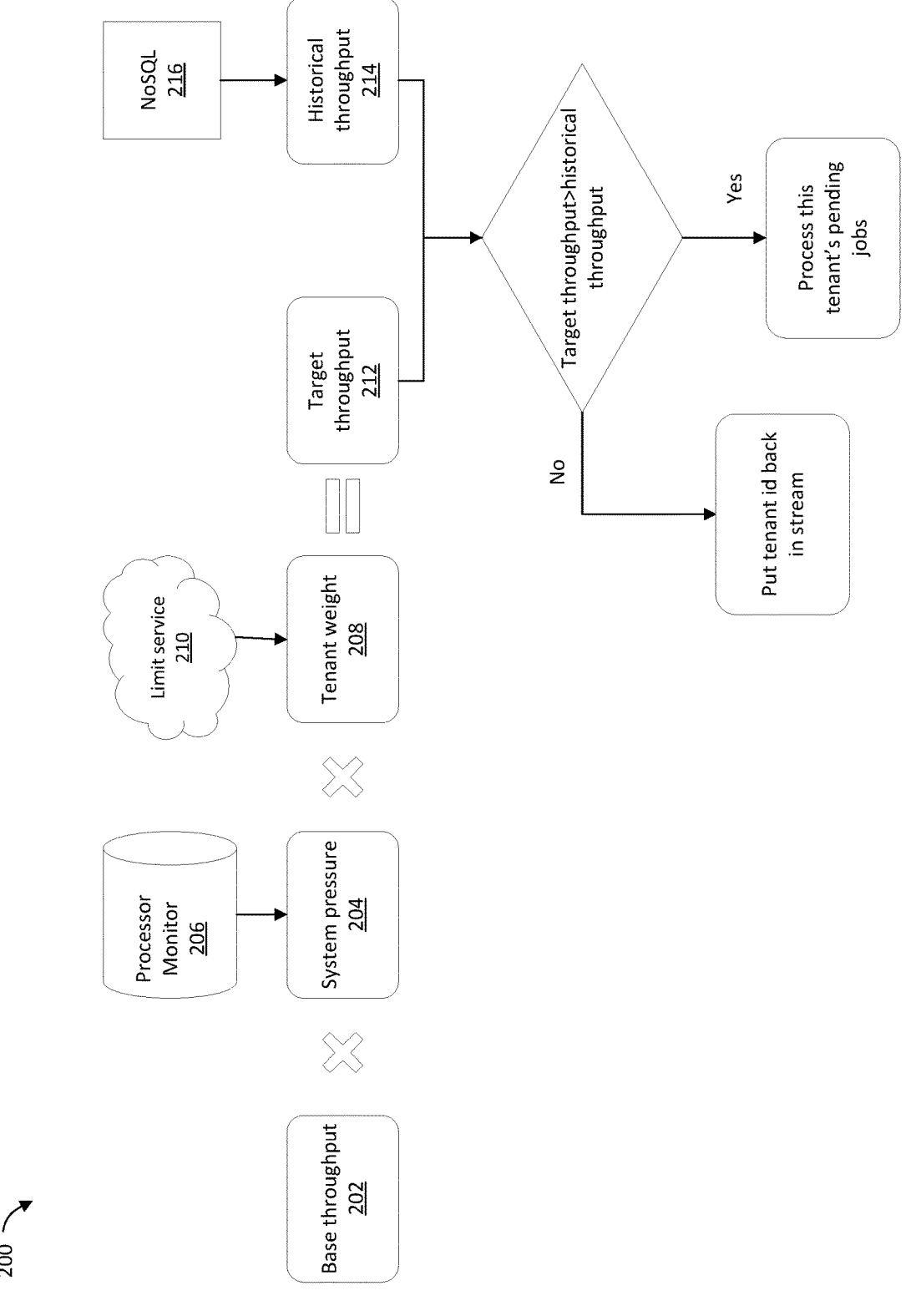
FIG. 2 is an illustration of a multi-tenant fairness operation, according to one or more embodiments.

FIG. 2 is an illustration 200 of a multi-tenant fairness operation unit, according to one or more embodiments. In the event that the priority processor receives a message from the staging stream, the priority processor can read a job metadata table to determine each of the past finished job associated with a tenant from the tenantID. For example, the priority processor can read the tenantID to determine each job associated with the tenant. If the average usage is below the quota (e.g., the historical throughput is less than the target throughput), the priority processor can forward the message to process the job request. The priority processor can update a status of the selected job to in progress in the job metadata table. The priority processor can create and transmit a message in the preprocessing stream. If the average usage is above the quota, the priority processor can place the message back into the staging stream.

The priority processor can implement a multi-tenant fairness determination as illustrated in FIG. 2 to compare a historical throughput with a target throughput. The target throughput can be based on a base throughput, a system pressure, and a tenant weight. The priority processor can determine a base throughput 202, "B", which can be the number of units that can be processed for a tenant over a period of time. The base throughput 202 can be determined by a cloud service provider and based on the cloud computing environment's capacity. For example, if the cloud computing environment can process 1000 pages/minute and there are ten tenants, the cloud service provider can set the base throughput at 100 pages/minute for each tenant. The base throughput 202 can change based on a change in the system capacity and a change in the number of tenants.

The priority processor can then determine the system pressure 204. The system pressure 204 can be used to dynamically adjust the target throughput for each tenant based on the system's status. The system pressure can be based on a processing speed, "S" of a processor (e.g., the processor 116 receiving messages from the processing stream 114). This speed can represent an auto-scale status and a server status. For example, auto-scaling can increase the processor speed, whereas issues on the server side can decrease the speed. The faster the processing speed, the larger the target throughput. The system pressure can also be based on the number of pending messages "M" in the processing stream (e.g., processing stream 114). As the number of pending messages increases, the system pressure 204 increases. Each of these variables can be obtained by a processor monitor 206. The priority processor can further obtain a tenant weight 208, "C" from a limit service 210 of the cloud service provider.

The target throughput 212 can be calculated by obtaining a product of the processing speed on the chunk status processor, the tenant weight, and the base throughput, and dividing the product by the number of pending messages. The formula can also be described as follows:

$$T = (S/M) \cdot (C) \cdot (B) \qquad (1)$$

The priority processor can further calculate a historical throughput 214, as an average number of units processed per unit of time for the tenant over a period of time. The priority process cover can be in communication with a database, such as a not only structured query language (NoSQL) database 216 to retrieve information to calculate the historical throughput 214. For example, the priority processor can calculate the average number of units processed per minute for the ten minutes that preceded the message. The priority processor can then determine whether the target throughput is greater than the historical throughput. If the target throughput 212 is greater than the historical throughput 214, the priority processor can allow the job request to be processed. If, however, the target throughput 212 is less than the historical throughput 214, the priority processor can throttle the request by placing the message back into the staging stream.

The following table provides four case examples for how the priority processor determines whether or not to process the job request from a tenant.

and any number of the described operations can be combined in any order and/or in parallel to implement the processes.

| | | | Number of pending | | | | |
|---|---|---|---|---|---|---|---|
| Case | Situation | Streaming processing speed | messages in the stream | Target Throughput | Historical Throughput | Compare | Behavior |
| 1 | A sends a 2000-page file to the service. | 1000 messages/ min | 2000 | 50 units/min | 133 units/min | target < historical | None of A's jobs will be processed at this point. |
| 2 | After A sent a 2000-page file, B sends a request with a 500-page file. | 1000 messages/ min | 2000 | 50 units/min | 0 units/min | target >= historical | A's job will go through. It will wait in the pipeline for 2 minutes before A's job gets processed |
| 3 | 10 Customers have been sending requests for a while. The average page number that has been processed for each user is 500 units. | 1000 messages/ min | 5000 | 20 units/min | 33 units/min | target < historical | No job will be processed at this point. Service will slowly take more jobs as the messages getting processed |
| 4 | For some reason, model processing speed is slow. | 300 messages/ min | 1000 | 30 units/min | 28 units/min | target > historical | All jobs will be processed at a speed of 30 units/min. |

CASE ANALYSIS

Figure 3:
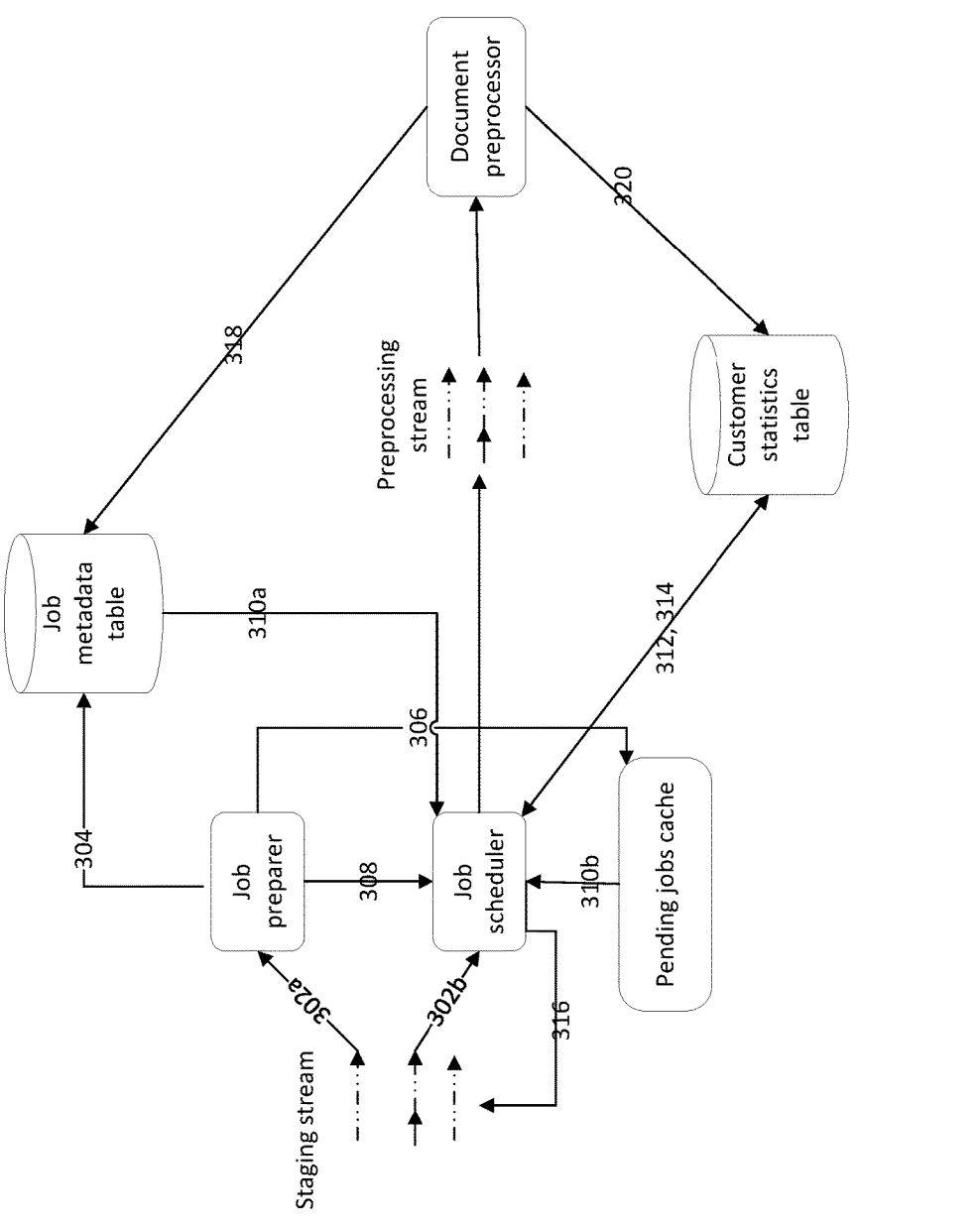
FIG. 3 is an illustration of a process flow for a job scheduler implementing a multi-tenant fairness algorithm, according to one or more embodiments.

FIG. 3 is an illustration of a process flow 300 for a job scheduler implementing a multi-tenant fairness algorithm, according to one or more embodiments. While the operations of processes 300 and 400 are described as being performed by generic computers, any suitable device (e.g., a migration service server, a source system, and a target system) may be used to perform one or more operations of these processes. Processes 300 and 400 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, At 302a, the method can include a computing device, such as a computing device hosting an API center, transmitting a message from a staging stream to a job preparer. The message can include an unprepared parent job identifier. At 302b, the method can include the computing device transmitting a message from the staging stream to a job scheduler. The message can include a prepared parent job identifier. The job identifier of step 302a can be the same job identifier as step 302b. The job identifier can distinguish the instance job request from other job requests transmitted through the staging stream.

At 304, the method can include the job preparer adding job information to a database. The database can store jobMetadata table. The jobMetadata table can include a set of key value pairs associated with the job, including an address of the data required to process the job.

At 306, the method can include the job preparer adding job information retrieved from the message to a pending jobs cache. All jobs from a single tenant can use a single pending jobs cache. For example, in addition to the job identifier, the messages can include a tenant identifier, which can be used to route all common job messages to a single pending job cache.

At 308, the method can include the job preparer setting a schedule for the current parent job identified in the messages at steps 302*a* and 302*b*.

In some instances, the computing system may not have a pending job cache. Therefore, at 310*a*, the job scheduler can retrieve a list of pending child jobs from the database with the jobMetadata table. The job scheduler can use this information for calculating a target throughput to compare with a historical throughput. At 310*b*, if the system does have pending job cache, the job scheduler can retrieve the list of pending child jobs from the pending job cache.

At 312, the method can include the job scheduler retrieving a historical throughput from a database that includes a customer statistics table.

At 314, the job scheduler can use the retrieved historical throughput to determine which jobs for the tenant have been processed and update a list of scheduled jobs from scheduled to completed. The job scheduler can further use the multi-tenant fairness algorithm described with respect to FIG. 2 and determine whether or not to process the tenant's job request. For example, the job scheduler can include a priority processor for implementing the above described multi-tenant fairness algorithm.

If the job scheduler determines that the historical throughput is greater than the target throughput, the method can include the job scheduler sending the message back to the staging stream at 316. If, however, the job scheduler determines that the target throughput is greater than the historical throughput, the method can include the job scheduler transmitting the message through a preprocessing stream at 318. The message can be received by a document preprocessing.

At 320, the method can include the document preprocessor using a preprocessing processor to update the number of units it is preprocessing at the database that include the customer statistics table.

A cloud services provider can use the job scheduler to ensure that each of its tenants is provided a fair share of the cloud computing system's processing capability. In this respect, each tenant has a more equitable expectation of completion time for a job request. Furthermore, the job scheduler is designed to account for the dynamic nature of cloud computing resource availability. For example, in a typical setting, the number of virtual machine instances for processing job requests can scale up or down based on the current number of job requests. The job scheduler accounts for resource availability dynamics when determining when to accept or throttle a job request FIG. 4 is a process flow 400 for determining whether to process a job request, according to one or more embodiments. At 402, the method can include a computing device receiving a first message from a first message stream, the first message comprising a job request from a tenant and a tenant identifier. The computing device can be a job scheduler of an asynchronous pipeline that is configured to implement a multi-tenant fairness algorithm. The message can be received from a staging stream and be one message of a plurality of messages.

At 404, the method can include the computing device detecting a base number of units permissible to be processed for the tenant over a unit of time. The base number of units can be set by a cloud service provider and be based on a maximum processing capacity and a number of tenants. For example, if the maximum processing capacity of a system if 20,000 units per minute and then there are 10 tenants, the base number can be 2,000 unit per minute for each customer.

At 406, the method can include the computing device receiving detecting a processing speed of a downstream processor of the asynchronous pipeline. The downstream processor can be a processor that is most likely to result in a bottleneck if the asynchronous pipeline becomes over-loaded. For example, the downstream processor can be the processor 116 of FIG. 1.

At 408, the method can include a computing device receiving detecting a number of messages in a second message stream, the downstream processor configured to receive messages from the second message stream. The messages in the second message stream can include messages from each of the tenants, and not necessarily the tenant that sent the first message. The current number of messages in the second message stream helps determine the amount of pressure that the system is in currently.

At 410, the method can include a computing device receiving determining a target throughput for the tenant based at least in part on a mathematical operation using the base number, the number of messages in the second message stream, and the processing speed on the downstream processor. For example, the target throughput can be calculated as the product of the base number and a quotient of the number of messages in the second message stream over the speed of the downstream processor. In some instances, the target throughput is further based on a product of a user weight as determined by the cloud service provider, the base number and a quotient of the number of messages in the second message stream over the speed of the downstream processor.

At 412, the method can include a computing device receiving determining a historical throughput for the tenant based at least in part on an average number of units processed over the unit of time. The unit of time can be the same unit of time of the base number and be for a time interval that precedes receipt of the first message. For example, the average number of units processed for the ten per minute for the past ten minutes preceding receipt of the first message.

At 414, the method can include a computing device receiving comparing the target throughput with the historical throughput to determine whether to process the job request. If the target throughput is greater than the historical through-put, the computing device can determine to schedule the job request for processing. If, however, the target throughput is less than the historical throughput than the computing device can transmit the message back to the first message stream. Once the computing device receives the first message again, the computing device can redetermine the historical throughput to determine if the job request should be processed. As the customer's job requests are being sent back to the first message stream, it is likely that the historical throughput has decreased, and the job request can be processed.

At 416, the method can include a computing device receiving scheduling the job request from the tenant based at least in part on the comparison. The computing device can create a second message that it can transmit over a message stream, such as a preprocessing stream to be received by a preprocessing processor.

All cloud computing service providers must effectively manage their resources to both timely process job requests and prevent job contention from creating a bottleneck of queued job requests. The job scheduler provides an effective algorithm that allows a tenant to present multiple job requests, and throttle one or more of those requests in instances that the cloud computing system resources are allotted to other tenants.

The job scheduler addresses the issue of pipeline domination for asynchronous processing in artificial intelligence (AI) services. The job scheduler prevents a small set of tenants from dominating the entire asynchronous job pipeline. With the above solution, Oracle can ensure multi-tenant fairness for its tenants and provide a better tenant experience.

The job scheduler is generic and pluggable. Therefore, other AI services can directly implement the job scheduler into their asynchronous processing architecture and shorten their turnaround time for delivering requested inferences to a tenant.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
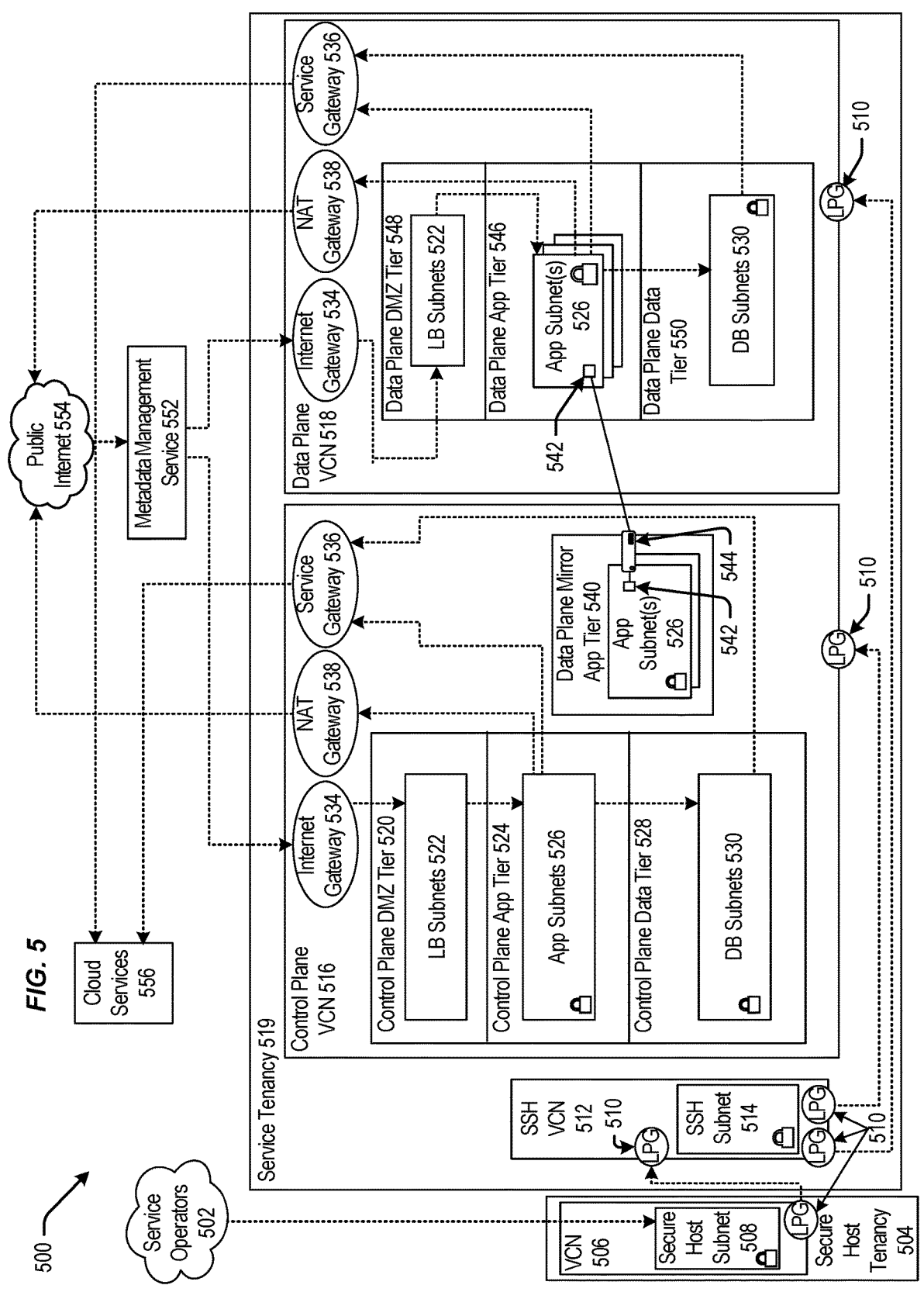
FIG. 5 is a block diagram illustrating one pattern for implementing a cloud infrastructure as a service system, according to one or more embodiments.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
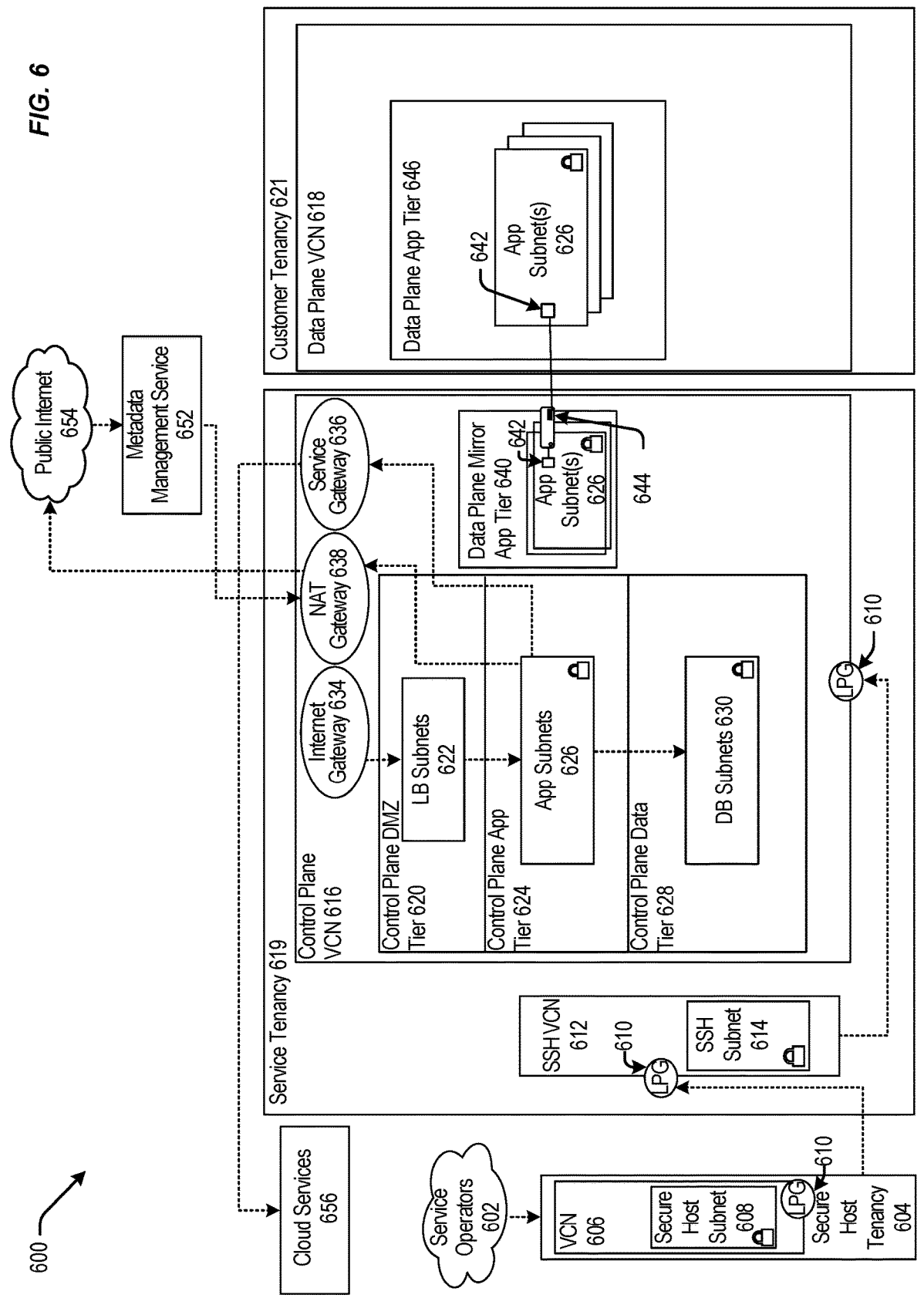
FIG. 6 is a block diagram illustrating another pattern for implementing a cloud infrastructure as a service system, according to one or more embodiments.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
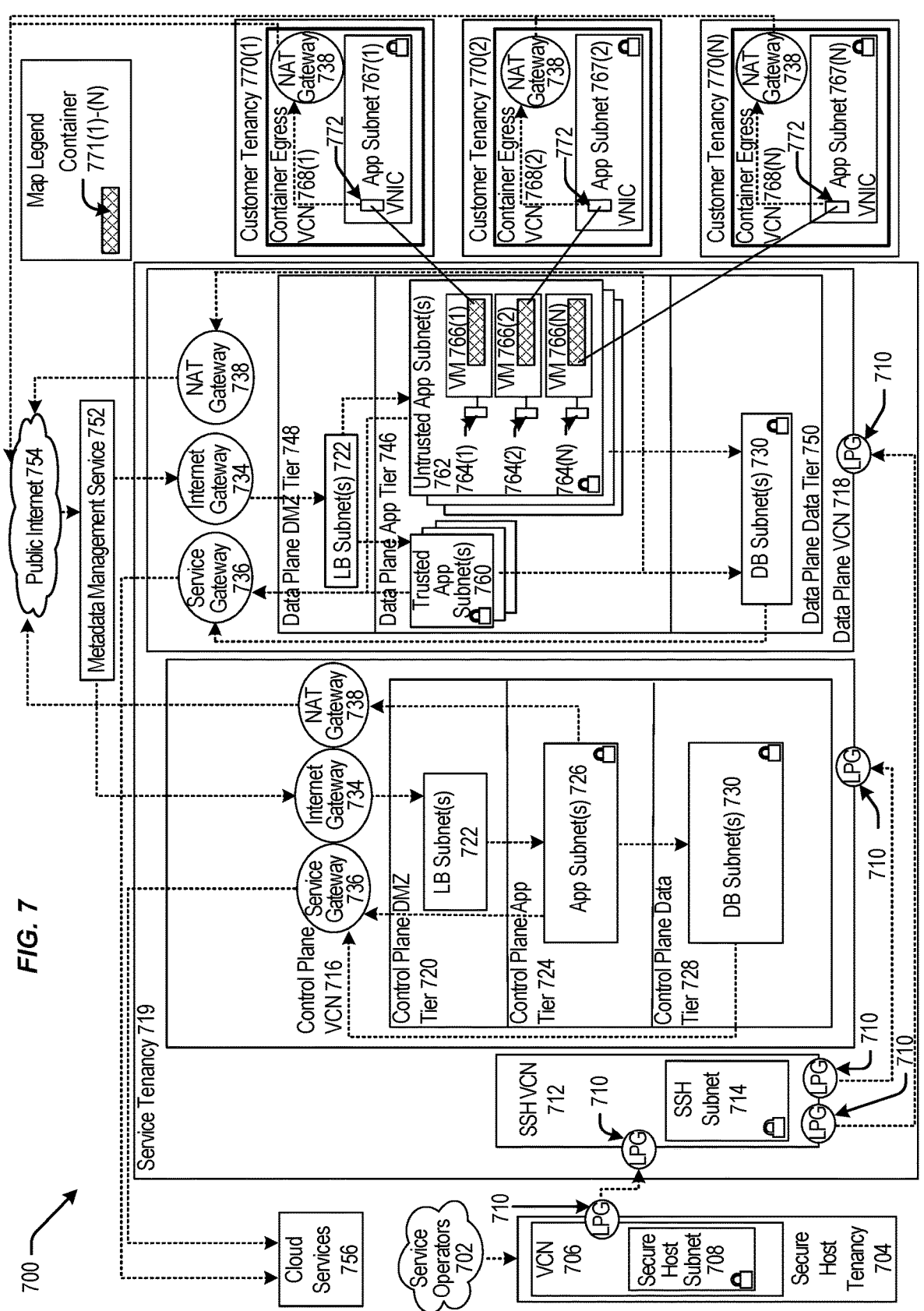
FIG. 7 is a block diagram illustrating another pattern for implementing a cloud infrastructure as a service system, according to one or more embodiments.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
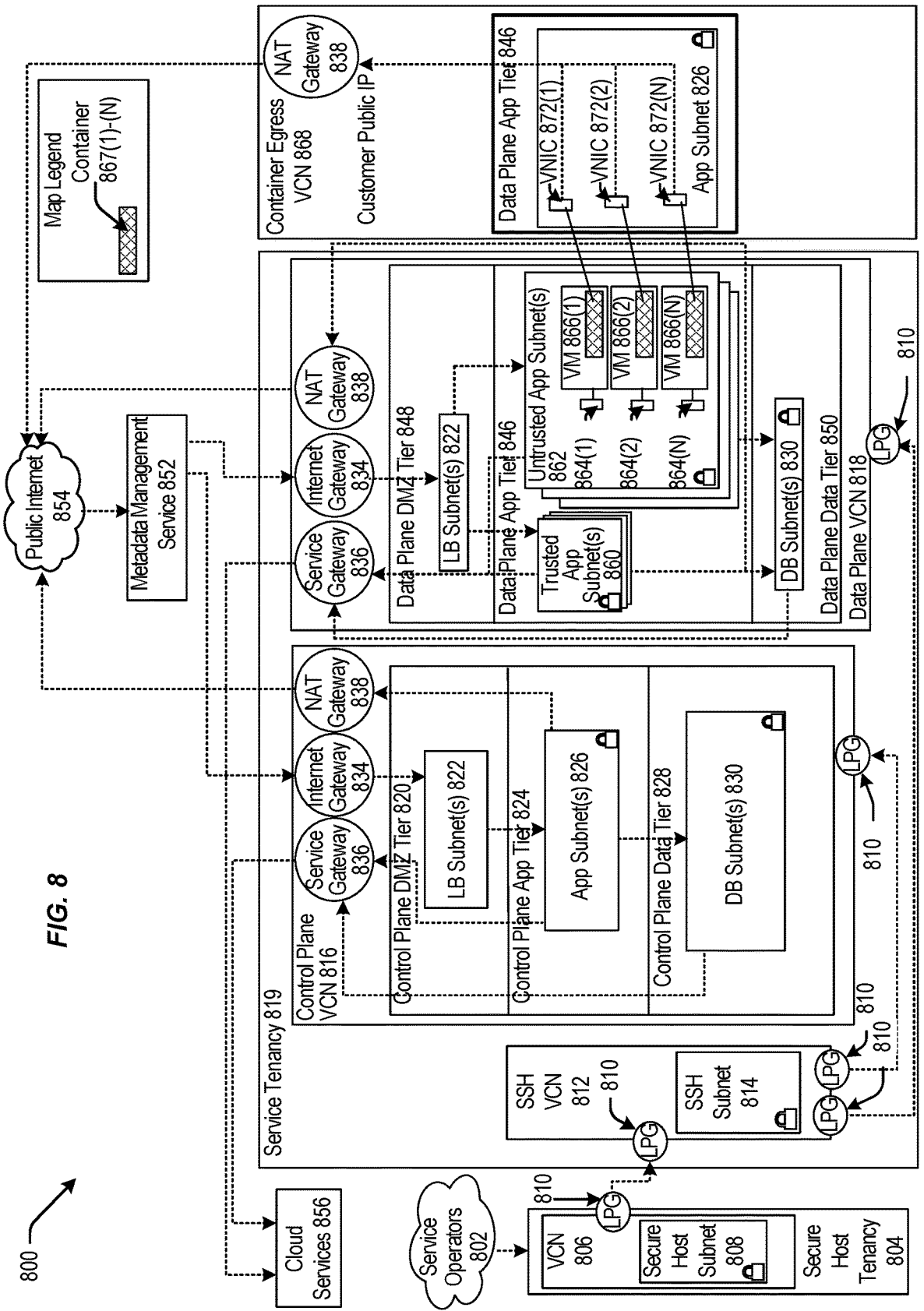
FIG. 8 is a block diagram illustrating another pattern for implementing a cloud infrastructure as a service system, according to one or more embodiments.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
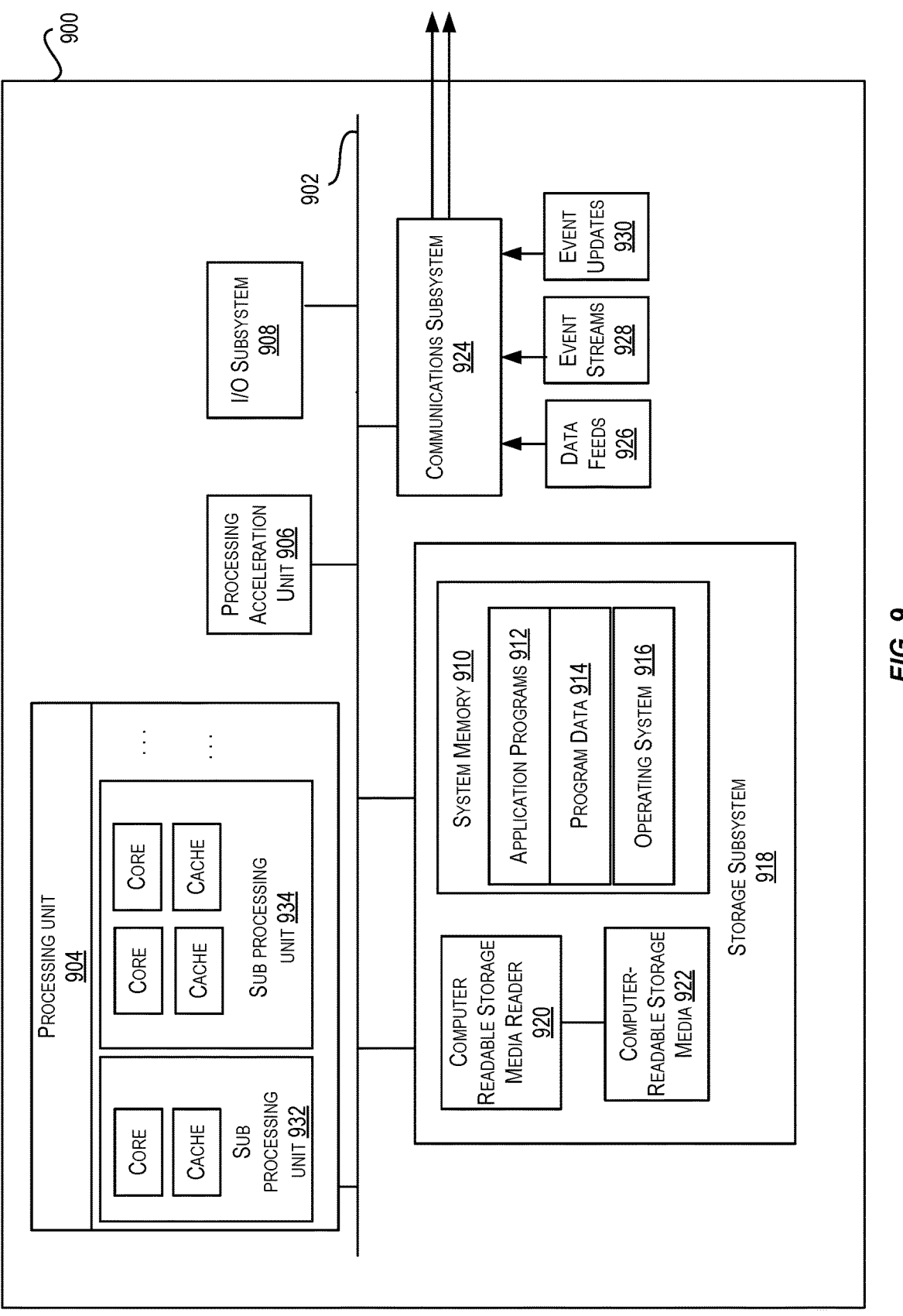
FIG. 9 is a block diagram illustrating an example computer system, according to one or more embodiments.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program services that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 918 may also provide a tangible computer-readable storage medium for storing the basic programming and data constructs that provide the functionality of some embodiments. Software (programs, code services, instructions) that when executed by a processor provide the functionality described above may be stored in storage subsystem 918. These software services or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910 and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a computing device, a first message from a first message stream, the first message comprising a job request from a tenant and a tenant identifier;

detecting, by the computing device, a base number of units permissible to be processed for the tenant over a unit of time;

detecting, by the computing device, a processing speed of a downstream processor of an asynchronous pipeline;

detecting, by the computing device, a number of messages in a second message stream, the downstream processor configured to receive messages from the second message stream;

determining, by the computing device, a target throughput for the tenant based at least in part on a mathematical operation using the base number, the number of messages in the second message stream, and the processing speed on the downstream processor;

determining, by the computing device, a historical throughput for the tenant based at least in part on an average number of units processed over the unit of time;

comparing, by the computing device, the target throughput with the historical throughput to determine whether to process the job request; and scheduling, by the computing device, the job request for processing based at least in part on the comparison, wherein scheduling the job request comprises:

creating a second message comprising a job identifier, a job identifier index value, and an address of data to be used to process the job request; and transmitting the second message to a preprocessing processor using a third message stream.

2. The method of claim 1, wherein the mathematical operation comprises:

determining a quotient of the number of messages in the second message stream over the processing speed of the downstream processor; and determining a product of the quotient and the base number, wherein the target throughput is the product.

3. The method of claim 1, wherein the method further comprises:

detecting a weight associated with the tenant;

determining a quotient of the number of messages in the second message stream over the processing speed of the downstream processor; and determining a product of the quotient, the base number, and the weight, wherein the target throughput is the product.

4. The method of claim 1, wherein scheduling the job request from the tenant based at least in part on the comparison comprises determining that the target throughput is greater than the historical throughput.

5. The method of claim 1, wherein the first message is received at first point in time, and wherein scheduling the job request from the tenant based at least in part on the comparison comprises:

determining that the historical throughput is greater than the target throughput;

transmitting the first message back into the first message stream based on the determination;

receiving the first message at a second point in time;

determining that the target throughput is greater than the historical throughput; and scheduling the job request based on the determination that the target throughput is greater than the historical throughput.

6. The method of claim 1, wherein the method further comprises determining the historical output comprises matching the tenant identifier of the first message with tenants identifiers associated with the units of the average number of units.

7. A computing device, comprising:

a processor; and a computer-readable medium including instructions that, when executed by the processor, cause the processor to perform operations comprising:

receiving a first message from a first message stream, the first message comprising a job request from a tenant and a tenant identifier;

detecting a base number of units permissible to be processed for the tenant over a unit of time;

detecting a processing speed of a downstream processor of an asynchronous pipeline;

detecting a number of messages in a second message stream, the downstream processor configured to receive messages from the second message stream;

determining a target throughput for the tenant based at least in part on a mathematical operation using the base number, the number of messages in the second message stream, and the processing speed on the downstream processor;

determining a historical throughput for the tenant based at least in part on an average number of units processed over the unit of time;

comparing the target throughput with the historical throughput to determine whether to process the job request; and scheduling the job request for processing based at least in part on the comparison, wherein scheduling the job request comprises:

creating a second message comprising a job identifier, a job identifier index value, and an address of data to be used to process the job request; and transmitting the second message to a preprocessing processor using a third message stream.

8. The device of claim 7, wherein the mathematical operation comprises:

determining a quotient of the number of messages in the second message stream over the processing speed of the downstream processor; and determining a product of the quotient and the base number, wherein the target throughput is the product.

9. The device of claim 7, wherein the instructions that, when executed by the processor, further cause the processor to perform operations comprising:

detecting a weight associated with the tenant;

determining a quotient of the number of messages in the second message stream over the processing speed of the downstream processor; and determining a product of the quotient, the base number, and the weight, wherein the target throughput is the product.

10. The device of claim 7, wherein scheduling the job request from the tenant based at least in part on the comparison comprises determining that the target throughput is greater than the historical throughput.

11. The device of claim 7, wherein the first message is received at first point in time, and wherein scheduling the job request from the tenant based at least in part on the comparison comprises:

determining that the historical throughput is greater than the target throughput;

transmitting the first message back into the first message stream based on the determination;

receiving the first message at a second point in time;

determining that the target throughput is greater than the historical throughput; and scheduling the job request based on the determination that the target throughput is greater than the historical throughput.

12. The device of claim 7, wherein the instructions that, when executed by the processor, further cause the processor to perform operations comprising matching the tenant identifier of the first message with tenants identifiers associated with the units of the average number of units.

13. A non-transitory computer-readable medium having stored thereon a sequence of instructions that, when executed by a processor, causes the processor to perform operations comprising:

receiving a first message from a first message stream, the first message comprising a job request from a tenant and a tenant identifier;

detecting a base number of units permissible to be processed for the tenant over a unit of time;

detecting a processing speed of a downstream processor of an asynchronous pipeline;

detecting a number of messages in a second message stream, the downstream processor configured to receive messages from the second message stream;

determining a target throughput for the tenant based at least in part on a mathematical operation using the base number, the number of messages in the second message stream, and the processing speed on the downstream processor;

determining a historical throughput for the tenant based at least in part on an average number of units processed over the unit of time;

comparing the target throughput with the historical throughput to determine whether to process the job request; and scheduling the job request for processing based at least in part on the comparison, wherein scheduling the job request comprises:

creating a second message comprising a job identifier, a job identifier index value, and an address of data to be used to process the job request; and transmitting the second message to a preprocessing processor using a third message stream.

14. The non-transitory computer-readable medium of claim 13, wherein the mathematical operation comprises:

determining a quotient of the number of messages in the second message stream over the processing speed of the downstream processor; and determining a product of the quotient and the base number, wherein the target throughput is the product.

15. The non-transitory computer-readable medium of claim 13, wherein the instructions that, when executed by the processor, further cause the processor to perform operations comprising:

detecting a weight associated with the tenant;

determining a quotient of the number of messages in the second message stream over the processing speed of the downstream processor; and determining a product of the quotient, the base number, and the weight, wherein the target throughput is the product.

16. The non-transitory computer-readable medium of claim 13, wherein scheduling the job request from the tenant based at least in part on the comparison comprises determining that the target throughput is greater than the historical throughput.

17. The non-transitory computer-readable medium of claim 13, wherein the first message is received at first point in time, and wherein scheduling the job request from the tenant based at least in part on the comparison comprises:

determining that the historical throughput is greater than the target throughput;

transmitting the first message back into the first message stream based on the determination;

receiving the first message at a second point in time;

determining that the target throughput is greater than the historical throughput; and scheduling the job request based on the determination that the target throughput is greater than the historical throughput.

* * * * *